United States Patent [19]

Izui et al.

[11] Patent Number: 5,305,235
[45] Date of Patent: Apr. 19, 1994

[54] MONITORING DIAGNOSIS DEVICE FOR ELECTRICAL APPLIANCE

[75] Inventors: Yoshio Izui, Amagasaki; Yoshiakira Akimoto, Yokohama; Hideo Tanaka; Hiromi Ogi, both of Tokyo, all of Japan

[73] Assignees: Mitsubishi Denki Kabushiki Kaisha; The Tokyo Electric Power Company, both of Tokyo, Japan

[21] Appl. No.: 911,068

[22] Filed: Jul. 9, 1992

[30] Foreign Application Priority Data

Jul. 10, 1991 [JP] Japan .................... 3-169587

[51] Int. Cl.⁵ .............................. G06F 15/20
[52] U.S. Cl. ........................ 364/551.01; 307/201; 307/464; 364/550; 395/21; 395/23; 395/24; 395/50; 395/911; 395/912
[58] Field of Search ............. 307/201, 464; 364/550, 364/551.01; 395/21, 23, 24, 50, 911, 912

[56] References Cited

U.S. PATENT DOCUMENTS

| | | | |
|---|---|---|---|
| 3,394,351 | 7/1968 | Martin | 307/201 |
| 5,039,870 | 8/1991 | Engeler | 307/464 X |
| 5,039,871 | 8/1991 | Engeler | 307/464 X |
| 5,107,497 | 4/1992 | Lirov et al. | 395/911 X |
| 5,123,017 | 6/1992 | Simpkins et al. | 395/911 X |
| 5,239,619 | 8/1993 | Takatori et al. | 395/23 |
| 5,251,151 | 10/1993 | Demjanenko et al. | 364/550 |
| 5,253,184 | 10/1993 | Kleinschnitz | 364/550 |

OTHER PUBLICATIONS

"Preventive Maintenance System for Gas Insulated Switchgear Using an Artificial Neural Network"; Hiromi Ogi, et al.; Third Symposium on Expert Systems Application to Power Systems; Japan; pp. 627-633; Apr. 1-5, 1991.

"Fault Diagnosis System for GIS Using an Artificial Neural Network"; Ogi et al.; Proceedings on the First International Forum on Applications to Neural Networks to Power Systems; Seattle, Washington; pp. 112-116; Jul. 23-26, 1991.

T. Yamagiwa et al., "Development of Preventive Maintenance System for Highly Reliable Gas Insulated Switchgear," 90 WH 160-2 PWRD, 1990 IEEE.

*Primary Examiner*—Edward R. Cosimano
*Attorney, Agent, or Firm*—Leydig, Voit & Mayer

[57] ABSTRACT

A monitoring diagnostic device for an electrical appliance such as gas insulated switchgear includes a sensor, such as an acceleration sensor, and a neural network including an input layer, an intermediate layer, and an output layer, each consisting of a plurality of neural elements. The input, intermediate and output layers are coupled to each other via a plurality of connection weights. The output of the sensor is first processed and then is supplied to the neural elements of the input layer. The connection weights are adjusted by means of learning data such that the output from the neural elements of the output layer of the neural network correctly identifies the causes of abnormality of the electrical appliance.

5 Claims, 11 Drawing Sheets

MONITORING DIAGNOSIS DEVICE FOR ELECTRICAL APPLIANCE

BACKGROUND OF THE INVENTION

This invention relates to monitoring diagnosis devices for electrical appliances, and more particularly to monitoring diagnosis devices for monitoring the occurrences of abnormality and diagnosing, identifying and inferring the causes of abnormality of electrical appliances, such as gas insulated electric devices, oil insulated electrical appliances, air insulated electrical appliances, vacuum insulated electrical appliances, and solid insulated electrical appliances, for interrupters, switchgears, disconnectors, voltage transformers, current transformers, buses, insulated meters, generators or dynamos, and electrical rotating machines.

Figure 12:
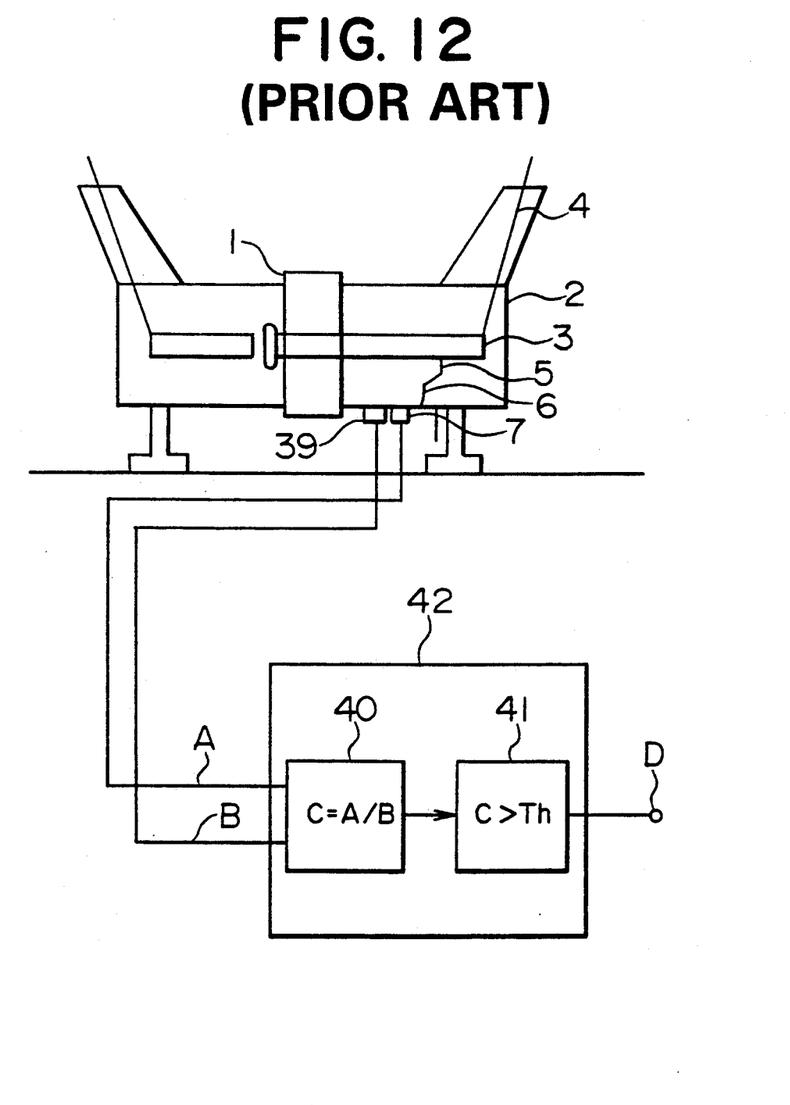
FIG. 12 is a diagrammatic view showing the structure of a conventional monitoring diagnosis device.

FIG. 12 is a diagrammatic view showing the structure of a conventional monitoring diagnosis device, which is disclosed in: T. Yamagiwa et al., "DEVELOPMENT OF PREVENTIVE MAINTENANCE SYSTEM FOR HIGHLY RELIABLE GAS INSULATED SWITCHGEAR", 90 WH 160-2 PWRD, 1990 IEEE.

In FIG. 12, an electrical appliance (in this case a gas insulated switchgear) includes a spacer 1 and a tank 2. A central conductor 3 accommodated within the tank 2 is connected to a power transmission line 4. A foreign object 5 may be attached to the central conductor 3 to cause partial discharges 6 within the tank 2. An acceleration sensor 7 and an ultrasonic sensor 39 mounted on the tank 2 detect the low and the high frequency vibrations. A divider circuit 40 calculates the ratio C of the output A of the acceleration sensor 7 and the output B of the ultrasonic sensor 39. A judgment circuit 41 judges whether or not the ratio C is greater than a predetermined threshold level Th. Thus, a controller 42 including the divider circuit 40 and the judgment circuit 41 monitors the occurrences of abnormality and diagnoses the causes thereof in accordance with a predetermined algorithm, outputting the monitoring signal D.

Next, the operation of the monitoring diagnosis device of FIG. 12 is described. The divider circuit 40 calculates the ratio C of the outputs A and B of the acceleration sensor 7 and the ultrasonic sensor 39. On receiving the ratio C, the judgment circuit 41 judges that an abnormality has occurred in the gas insulated switchgear when the ratio is greater than the threshold Th. When the ratio is less than the threshold Th, the judgment circuit 41 judges that the outputs of the acceleration sensor 7 and the ultrasonic sensor 39 are noises and hence that no abnormality is present. The level of the threshold Th is set in accordance with experimental results or experience.

Thus, the conventional monitoring diagnosis device has the following disadvantage. The occurrences of abnormality are determined in accordance with the algorithm by which the ratio C of the outputs of two sensors is compared with a predetermined threshold Th and an occurrence of abnormality is determined when the ratio is greater than the threshold Th. The threshold Th must therefore be determined by means of experiments or experience. This determination is time consuming. The determination of the threshold Th must be renewed when the type of the gas insulated switchgear changes, or when the installation site and hence the background noise environment change. Further, it is necessary to update the level of the threshold Th in accordance with the aging of the device. Furthermore, the determination algorithm requires two sensors. When only one sensor is available, the algorithm cannot be used. On the other hand, even if three or more sensors are installed, the information supplied by the additional sensors cannot be utilized in the diagnosis. Thus applicability of the monitoring diagnosis device is limited. Further, the conventional monitoring diagnosis device provides only the information on whether the gas insulated electric device is in an abnormal or normal state: the causes of abnormality cannot be identified.

SUMMARY OF THE INVENTION

It is therefore an object of this invention to provide a monitoring diagnosis device for an electrical appliance which is capable not only of distinguishing the normal and the abnormal states but also of identifying the causes of abnormality, and which can effectively utilize information supplied by an arbitrary number of sensors and is capable of flexible adaptation to the changes in the types of electrical appliances and the installation sites, or the changes of characteristics due to the aging of the electrical appliances.

The above object is accomplished in accordance with the principle of this invention by a monitoring diagnosis device for an electrical appliance, which comprises: sensor means for detecting a parameter of the electrical appliance and generating an output correspond thereto indicative of a cause of abnormality of the electrical appliance; and a neural network means including an input layer, an intermediate layer, and an output layer, the input layer, intermediate layer, and output layer each consisting of a plurality of neural elements each simulating a living neuron, wherein the neural elements of the input layer are coupled to the neural elements of the intermediate layer via respective connection weights, and the neural elements of the intermediate layer are coupled to the neural elements of the output layer via respective connection weights; and wherein the connection weights between the input layer and intermediate layer and between the intermediate layer and the output layer are adjusted on the basis of learning data consisting of causes of abnormality and instances of the output of the sensor means, such that a neural element of the output layer corresponding to a cause of abnormality is asserted in response to the output of the sensor means while other neural elements of the output layer are negated.

Preferably, the neural network means comprises: at least a first and a second neural network module, and the first module has a normal and an abnormal state output corresponding to a normal and an abnormal state of the electrical appliance, respectively, the first module including an input layer, an intermediate layer, and an output layer, and the input layer, intermediate layer, and output layer each consisting of a plurality of neural elements each simulating a living neuron, wherein the neural elements of the input layer are coupled to the neural elements of the intermediate layer via respective connection weights, and the neural elements of the intermediate layer are coupled to the neural elements of the output layer via respective connection weights, and the connection weights between the input layer and intermediate layer and between the intermediate layer and the output layer are adjusted, on the basis of learning data consisting of information obtained from the output of the sensor means and a correspondence between the information and normal and abnormal state of the electrical appliance, such that the normal state output is asserted in response to a normal state of the electrical appliance and abnormal state output is asserted in response to an abnormal state of the electrical appliance; and the second module includes an input layer, an intermediate layer, and an output layer, the input layer, intermediate layer, and output layer each consisting of a plurality of neural elements each simulating a living neuron, wherein the neural elements of the input layer are coupled to the neural elements of the intermediate layer via respective connection weights, and the neural elements of the intermediate layer are coupled to the neural elements of the output layer via respective connection weights, and the connection weights between the input layer and intermediate layer and between the intermediate layer arid the output layer are adjusted on the basis of learning data consisting of causes of abnormality and instances of the output of the sensor means, such that a neural element corresponding to a cause of abnormality is asserted in response to the output of the sensor means, wherein the second module has an input coupled to the abnormal state output of the first module and is activated in response to an assertion of abnormal state output of the first module.

Still preferably, the neural network means comprises at least a first, a second, a third and a fourth neural network module, each including an input layer, an intermediate layer, and an output layer, and the input layer, intermediate layer, and output layer each consisting of a plurality of neural elements each simulating a living neuron, wherein the neural elements of the input layer are coupled to the neural elements of the intermediate layer via respective connection weights, and the neural elements of the intermediate layer are coupled to the neural elements of the output layer via respective connection weights; the first module having a normal and an abnormal state output corresponding to a normal and an abnormal state of the electrical appliance, respectively, and the connection weights between the input layer and intermediate layer and between the intermediate layer and the output layer are adjusted, on the basis of learning data consisting of information obtained from the output of the sensor means and a correspondence between the information and normal and abnormal state of the electrical appliance, such that the normal state output is asserted in response to a normal state of the electrical appliance and abnormal state output is asserted in response to an abnormal state of the electrical appliance; and the second module having an input coupled to the abnormal state output of the first module and the second module being activated in response to an assertion of abnormal state output of the first module, and the second module having at least a first and a second output corresponding to a first and a second group of causes of abnormality of the electrical appliance, the connection weights between the input layer and intermediate layer and between the intermediate layer and the output layer are adjusted on the basis of learning data consisting of the groups of causes of abnormality and instances of the output of the sensor means, such that an output corresponding to a group of causes of abnormality is asserted in response to the output of the sensor means, the third module having an input coupled to the first output of the second module, the third module being activated in response to an assertion of the first output of the second module, wherein the connection weights between the input layer and intermediate layer and between the intermediate layer and the output layer are adjusted on the basis of learning data consisting of the first group of causes of abnormality and instances of the output of the sensor means, such that a neural element corresponding to a cause of abnormality belonging to the first group of causes of abnormality is asserted in response to the output of the sensor means; and the fourth module having an input coupled to the second output of the second module, the fourth module being activated in response to an assertion of the second output of the second module, wherein the connection weights between the input layer and intermediate layer and between the intermediate layer and the output layer are adjusted on the basis of learning data consisting of the second group of causes of abnormality and instances of the output of the sensor means, such that a neural element corresponding to a cause of abnormality belonging to the second group of causes of abnormality is asserted in response to the output of the sensor means.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding 17 parts or portions.

DETAILED DESCRIPTION OF THE PREFERRED EMBODIMENTS

Referring now to the accompanying drawings, the preferred embodiments of this invention are described.

Figure 1:
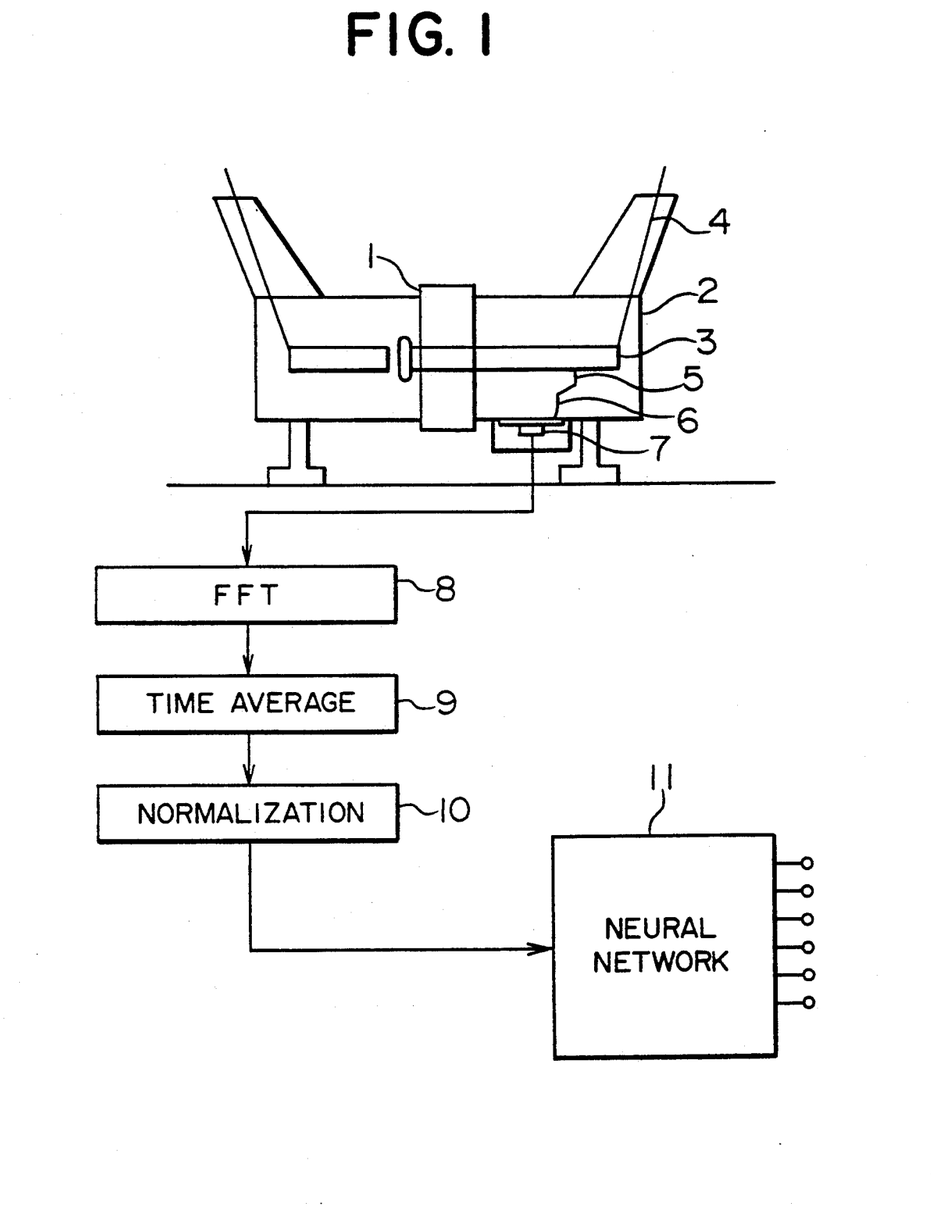
FIG. 1 is a diagrammatic view showing the structure of a monitoring diagnosis device according to an embodiment of this invention.

FIG. 1 is a diagrammatic view showing the structure of a monitoring diagnosis device according to an embodiment of this invention. The parts 1 through 4 are similar to those of FIG. 12: a gas insulated switchgear, a typical example of an electrical appliance, includes a spacer 1 and tank 2, in which a central conductor 3 coupled to a power transmission line 4 is accommodated. Due to a foreign object 5 intruding into the tank 2, the partial discharges 6 are generated across the foreign object 5 and the grounded tank 2. The vibrations of the insulating gas within the tank 2 caused by the partial discharges 6 are transmitted to the tank 2, and the resulting mechanical vibrations of the tank 2 are detected by the acceleration sensor 7. The waveform with respect to time of the output of the acceleration sensor 7 is subjected to FFT (Fast Fourier Transform) by means of an FFT (Fast Fourier Transform) calculator 8, to obtain a spectrum of the waveform. The time average of the spectrum is calculated by a time average calculator 9 and then is normalized by a normalizer 10 such that the peak level of the spectrum becomes equal to one (unity). In response to the normalized spectrum supplied from the normalizer 10, a neural network 11 identifies the abnormality state of the gas insulated switchgear.

Figure 2:
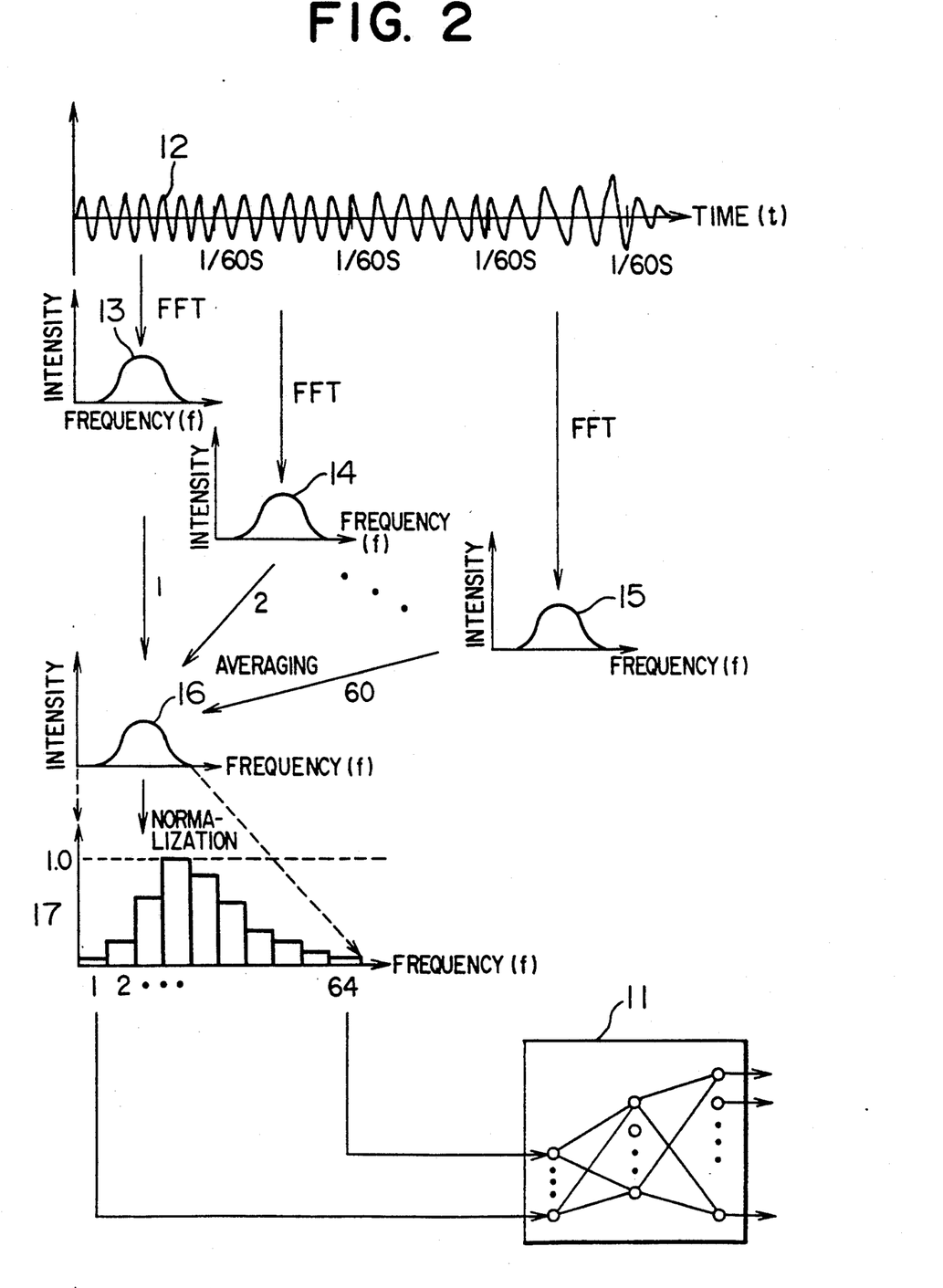
FIG. 2 is a diagram showing the operations of the FFT (Fast Fourier Transform) calculator, the time average calculator, and the normalizer of the monitoring diagnosis device of FIG. 1.

FIG. 2 is a diagram showing the operations of the FFT (Fast Fourier Transform) calculator, the time average calculator, and the normalizer of the monitoring diagnosis device of FIG. 1. The output waveform 12 of the acceleration sensor 7 with respect to time t (the waveform shown at the top in FIG. 2) is sampled for each interval of one sixtieth (1/60) seconds, in synchronism with the frequency, 60 Hz, of the power transmission system associated with the gas insulated switchgear. The sampled waveforms for every one sixtieth (1/60) seconds are subjected to FFT by means of the FFT (Fast Fourier Transform) calculator 8, thereby obtaining 60 sample spectrum curves 13, 14, 15 for every one second. The spectrum curves 13, 14, 15 represent the intensity (plotted along the ordinate) with respect to the frequency f (plotted along the abscissa) of the waveform 12 for the respective sampling intervals of 1/60 seconds. The spectrum curves 13, 14, 15 are then averaged via the time average calculator 9, to obtain an averaged spectrum carve 16. In the case of the embodiment shown in FIG. 2, sixty spectrum curves for one second are averaged. Then, the normalizer 10 normalizes the peak intensity of the spectrum to one (unity) and divides the frequency band width into a number of classes or intervals to obtain a normalized spectrum histogram 17. The figure shows the case where the frequency is divided into sixty four (64) classes or intervals. The sixty four intensity levels of the normalized spectrum histogram 17 thus obtained by the normalizer 10 are input to the corresponding neural elements of the input layer of the neural network 11, as described below.

Figure 3:
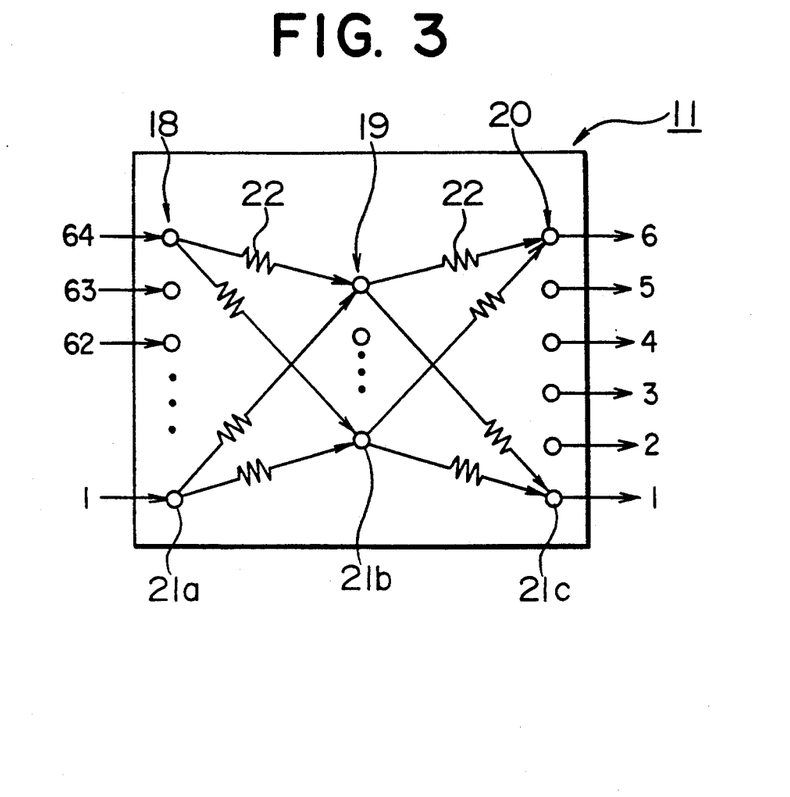
FIG. 3 is a diagram showing the structure of the neural network of FIG. 1.

FIG. 3 is a diagram showing the structure of the neural network of FIG. 1. The neural network 11 includes: an input layer 18 consisting of a plurality of neural elements 21a; an intermediate layer 19 consisting of a plurality of neural elements 21b; and an output layer 20 consisting of a plurality of neural elements 21c. The neural elements 21a of the input layer 18 are coupled to the neural elements 21b of the intermediate layer 19 via the connection weights 22. Similarly, the neural elements 21b of the intermediate layer 19 are coupled to the neural elements 21c of the output layer 20 via the connection weights 22. For simplicity, only a small number of connection weights 22 are shown in FIG. 3.

In FIG. 3, the sixty four intensity levels of the normalized spectrum histogram 17 are input to corresponding neural elements 21a, numbered from 1 to 64 in the figure, of the input layer 18 and are processed by the neural network 11. The information thus input into the input layer 18 proceeds to the intermediate layer 19 via respective connection weights 22, and thence to the output layer 20 via the respective connection weights 22, such that the outputs of the neural elements 21c of the output layer 20 identify the causes of abnormality. In the case shown in FIG. 3, the output layer 20 consists of six neural elements 21c, numbered from 1 to 6. Thus, for example, the assertion of output 1 of the output layer 20 indicates the normal state; that of output 2, an adhesion of a foreign object to the central conductor; that of output 3, an adhesion of a foreign object to the interior wall of the tank; that of output 4, a floating foreign object within the tank; that of output 5, bad contact at the central contacts of the central conductor; and that of output 6, bad contact at the two end electrodes of the central conductor. Thus, for example, when the output of the neural element 1 of the output layer 20 is great compared with outputs 2 through 6 of other neural elements of the output layer 20, the gas insulated switchgear is determined to be normal; when the output of the neural element 2 of the output layer 20 is great compared with outputs 1 and 3 through 6 of other neural elements of the output layer 20, an occurrence of an adhesion of a foreign object to the central conductor is identified. The other causes of abnormality are identified in a similar manner.

Figure 4:
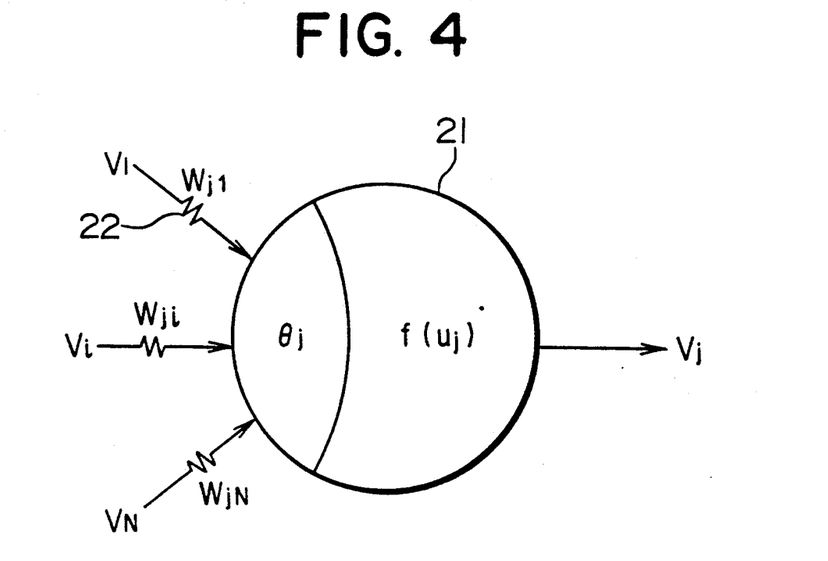
FIG. 4 is a diagram showing the structure of a single neural element simulating the function of a living neuron.

FIG. 4 is a diagram showing the structure of a single neural element simulating the function of a living neuron. The neural element 21, identified with the subscript j, has an interior state $u_j$ which is determined by the inputs thereto and the characteristic threshold level $\theta_j$ thereof. If the neural element 21 is in the intermediate layer 19 or in the output layer 20, the neural element 21 is coupled to the outputs $V_1, \ldots, V_i, \ldots, V_N$ of the neural elements of the previous layer via the respective connection weights $W_{ji}, \ldots, W_{ji}, \ldots, W_{jN}$. Then, the interior state $u_j$ of the neural element 21 is represented by the equation:

$$u_j = \sum_{i=1}^{N} W_{ji} \cdot V_i - \theta_j$$

The output $V_j$ of the neural element 21 is represented by a non-linear sigmoid function $f(u_j)$ of the interior state $u_j$:

$$V_j = f(u_j)$$

where $$f(u_j) = 1/(1 + exp(-u_j))$$

If the neural element 21 of FIG. 3 is in the input layer 18 or intermediate layer 19, the output $V_j$ of the neural element 21 is input to the neural elements of the subsequent layer via the respective connection weights. On the other hand, if the neural element 21 is in the output layer 20, the output $V_j$ represents the abnormality state of the gas insulated switchgear.

As described above, in response to the normalized spectrum histogram 17 the neural network 11 outputs the normality/abnormality signal from the output layer 20. The neural network 11 must first be trained (i.e., subjected to a learning step) to output the correct diagnosis signal. This training is effected as follows. First, the spectrum histograms of respective abnormal states are determined experimentally. Next, the spectrum histograms thus obtained for the respective abnormality states are input to the neural network 11 and the respective values of the connection weights 22 connecting the input layer 18 to the intermediate layer 19 and the intermediate layer 19 to the output layer 20 are adjusted in accordance with an appropriate learning algorithm such that the output of the neural element corresponding to the abnormality state indicated by the input spectrum histogram becomes equal to one (unity) and the outputs of the other neural elements 21c of the output layer 20 vanish (become equal to 0). The learning may be effected by the back propagation method by which the square error of the outputs of the output layer 20 for the learning data is successively reduced on the basis of the steepest descent method.

As a result of the learning, the respective connection weights 22 of the neural network 11 are adjusted such that, when a spectrum histogram is input to the neural network 11 in actual service, the neural element of the output layer 20 corresponding to the abnormality is asserted while the other neural elements are negated (i.e., are at the 0 level). Thus, after the learning, the neural network 11 stores, in the form of the values of the connection weights 22, the information on the correspondence between the spectrum histograms (as obtained from the output of the acceleration sensor 7) and the abnormality states. When the normalized spectrum histogram 17 obtained from the output waveform of the acceleration sensor 7 is supplied to the neural network 11 in actual service operation, only the output of the neural element of the output layer 20 corresponding to the abnormality state indicated by the normalized spectrum histogram 17 is asserted and thus the output of the neural network 11 indicates correctly the abnormality state of the gas insulated switchgear. As a result, the monitoring diagnosis device is not only capable of determining whether the gas insulated switchgear is normal or abnormal, but also of identifying the causes of abnormality.

Further, by collecting the learning data (i.e., the spectrum histograms for the respective abnormality states) during the service operation of the gas insulated switchgear and then subjecting the neural network 11 to the learning process, the monitoring diagnosis device can be adapted to the changes in the installation sites or the changes of the characteristics of the gas insulated switchgear due to the aging. Further, by obtaining the learning data for various types of electrical appliances and then subjecting the monitoring diagnosis device to the learning step, the monitoring diagnosis device having the same structure as described above can be used for a variety of types of electrical appliances.

Figure 5:
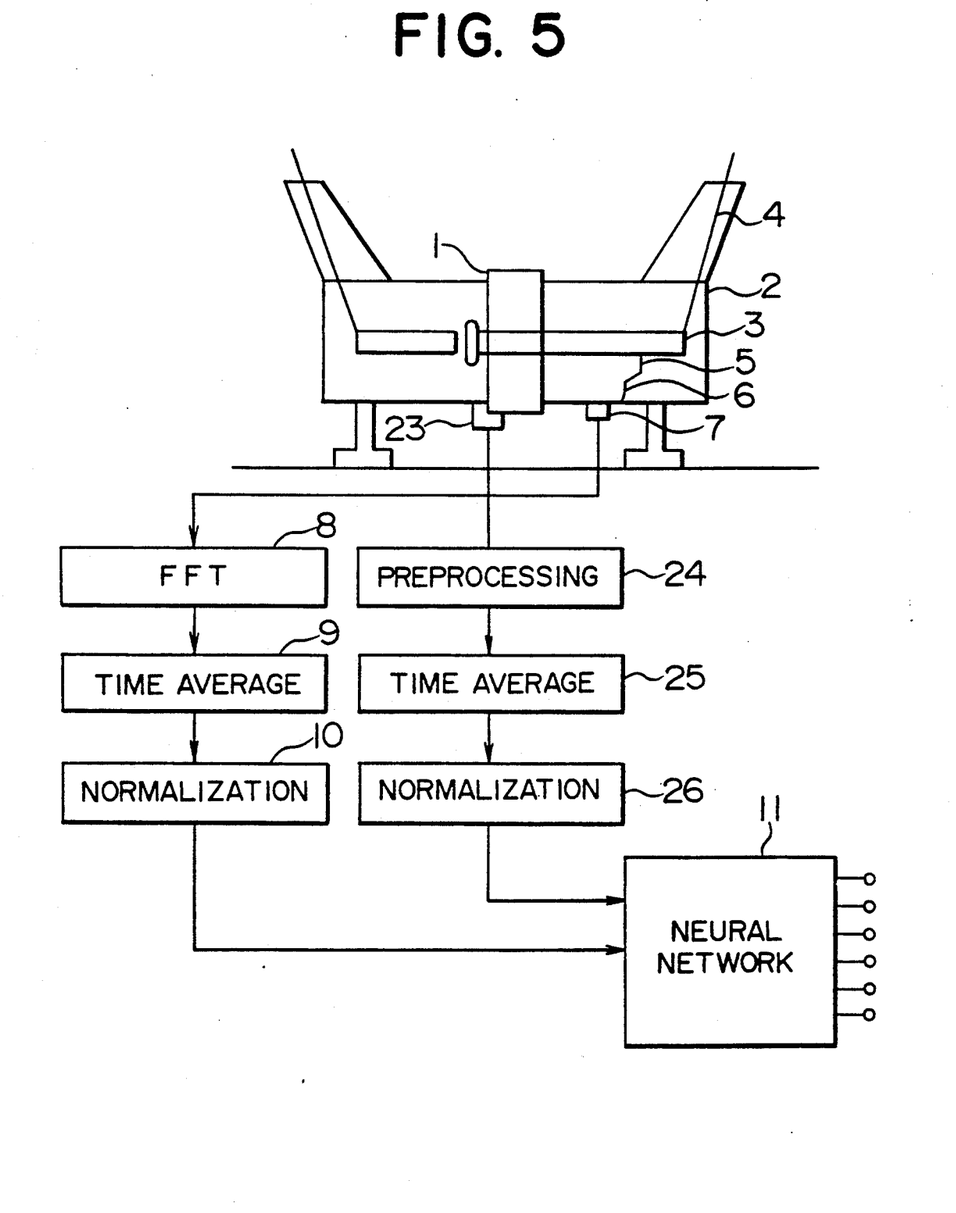
FIG. 5 is a diagrammatic view snowing the structure of a monitoring diagnosis device according to a second embodiment of this invention.

FIG. 5 is a diagrammatic view showing the structure of a monitoring, diagnosis device according to a second embodiment of this invention. The embodiment of FIG. 5 includes, in addition to the parts corresponding to those of the first embodiment, a partial discharge sensor 23 for detecting the rise of the potential of the tank 2 occasioned by the abnormality of the gas insulated switchgear. The output of the partial discharge sensor 23 is preprocessed by a preprocessor 24. A time average calculator 25 then calculates the time average, and a normalizer 26 normalizes the peak level to one (unity). The normalized output of the normalizer 26 is supplied to the neural network 11 in addition to the spectrum histogram obtained from the output of the acceleration sensor 7.

Figure 6:
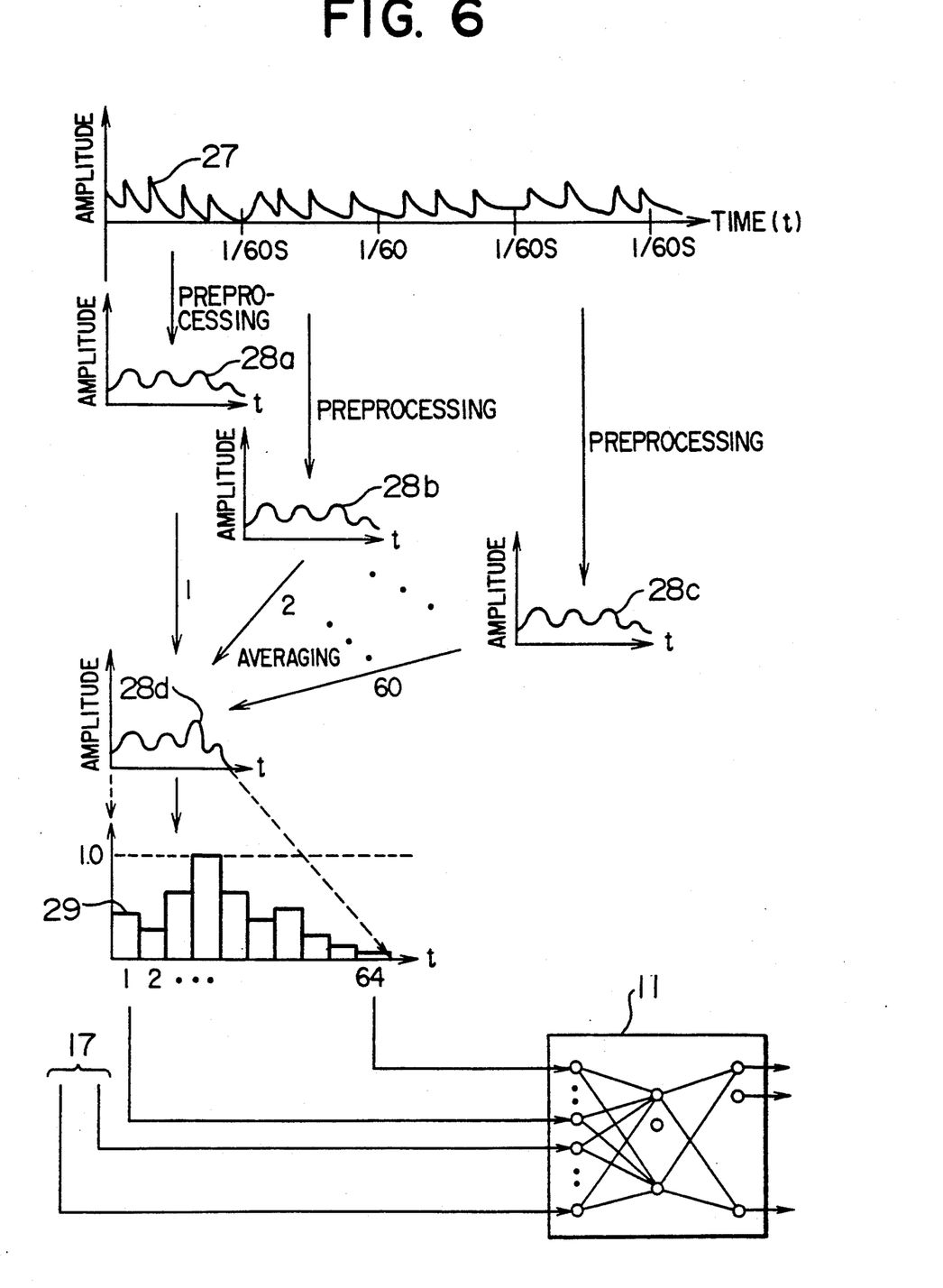
FIG. 6 is a diagram showing the operations of the preprocessor, the time average calculator, and the normalizer of the monitoring diagnosis device of FIG. 5.

FIG. 6 is a diagram showing the operations of the preprocessor, the time average calculator, and the normalizer of the monitoring diagnosis device of FIG. 5. The output waveform 27 of the partial discharge sensor 23, representing the variation of the amplitude of the output of the partial discharge sensor 23 (plotted along the ordinate) with respect to time t (plotted along the abscissa), is sampled for each interval of one sixtieth (1/60) seconds, in synchronism with the frequency (60 Hz) of the power transmission system associated with the gas insulated switchgear. The sampled waveforms for respective 1/60 seconds are preprocessed by the preprocessor 24. Thus, for every one second, sixty (60) preprocessed waveforms 28a, 28b, 28c are obtained. The sixty waveforms are averaged by the time average calculator 25 to obtain the averaged waveform 28d. Further, the time interval (1/60 seconds) is divided into a plurality of sub-intervals and the peak level of the waveform is normalized to one (unity) by the normalizer 26, to obtain thereby the normalized waveform histogram 29. FIG. 6 shows the case where the time interval is divided into 64 sub-intervals or classes. The respective levels of the normalized waveform histogram 29 are input to the corresponding neural elements of the input layer of the neural network 11, in addition to the normalized spectrum histogram 17 obtained from the output of the acceleration sensor 7.

Figure 7:
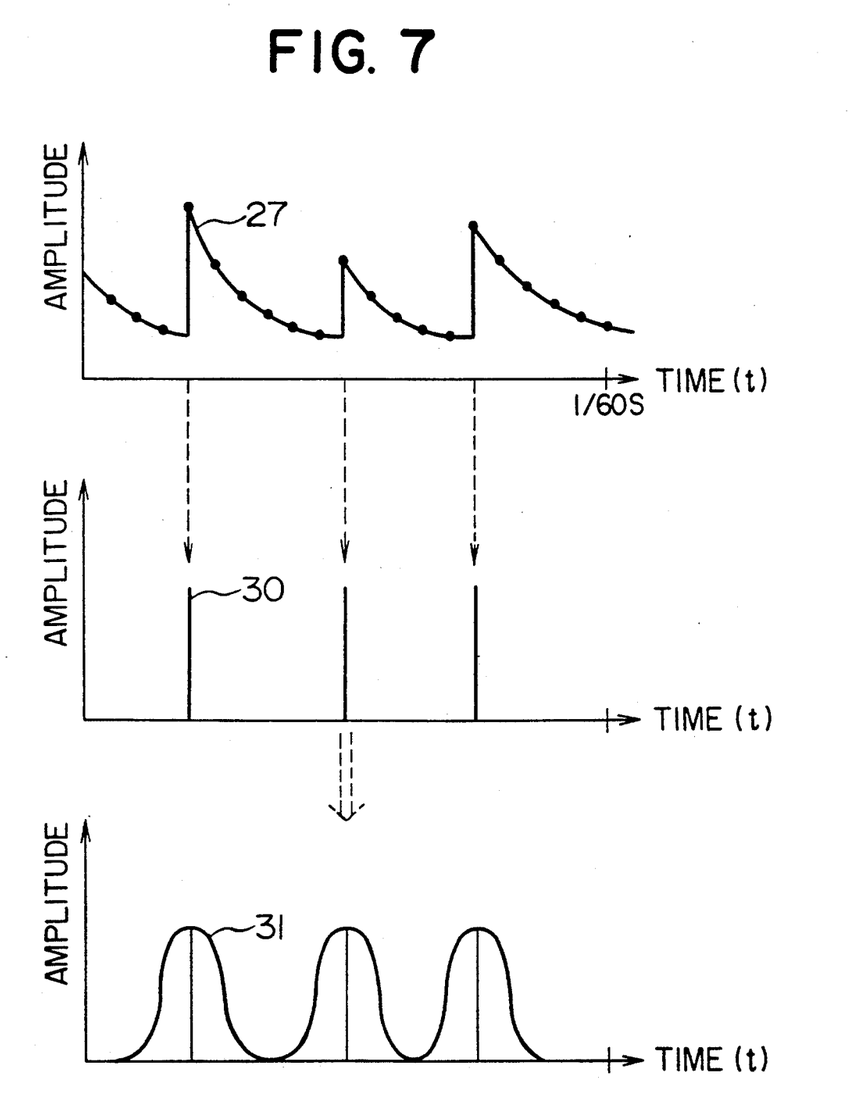
FIG. 7 is a diagram showing the details of the preprocessing of the output waveform of the partial discharge sensor of FIG. 5.

FIG. 7 is a diagram showing the details of the preprocessing of the output waveform of the partial discharge sensor of FIG. 5. During each interval of 1/60 seconds, the output waveform 27 is sampled at a number of sample points as indicated by dots on the output waveform 27 shown at the top in FIG. 7. The preprocessor 24 compares the amplitudes of successive two sample points (indicated by dots in the figure) to determine the time points at which the amplitude of the output waveform 27 changes abruptly, and thereby obtains the impulse waveform 30 shown at the middle in FIG. 7. Further, Gaussian distribution curves, centered on respective peaks of the impulse waveform 30, are superposed on each other to obtain the smoothed characteristic waveform 31. The above is an example of the preprocessing step effected by the preprocessor 24. In FIG. 7, time t is plotted along the abscissa, and the amplitude is plotted along the ordinate.

The learning process of the neural network 11, namely the adjustment of the weights thereof for optimal output characteristics, can be effected in the same manner as described above. However, since the information obtained from the output of the partial discharge sensor 23 is supplied to the neural network 11 in addition to the information obtained from the output of the acceleration sensor 7, the neural network 11 is capable of identifying abnormal states which cannot be identified on the basis of the output of the acceleration sensor 7 alone.

When additional sensors are installed, the information obtained from the outputs of the additional sensors may be supplied to the neural network 11, just as the output information of the partial discharge sensor 23 has been added to that of the acceleration sensor 7 in the second embodiment. The identification accuracy can thereby be enhanced.

Figure 8:
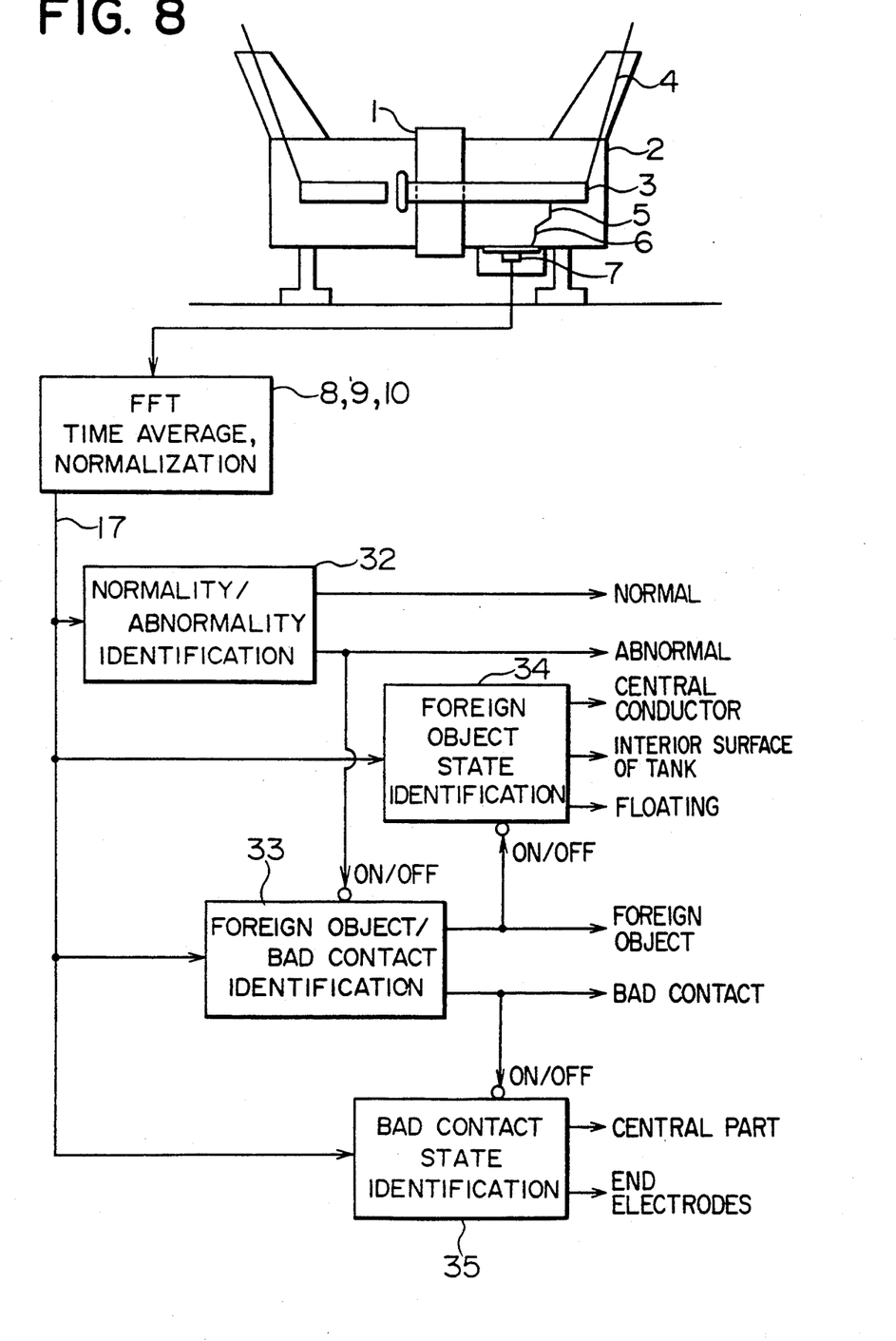
FIG. 8 is a diagrammatic view showing the structure of a monitoring diagnosis device according to a third embodiment of this invention.

FIG. 8 is a diagrammatic view showing the structure of a monitoring, diagnosis device according to a third embodiment of this invention. The parts 1 through 10 are identical to those of FIG. 1 (the parts 8, 9, and 10 are shown in a single block). The neural network device, however, is divided into several modules: a normality/abnormality identification module 32, a foreign object intrusion/bad contact identification module 33, a foreign object intrusion state identification module 34, and a, bad contact state identification module 35. To each one of the modules 32 through 35 is input the normalized spectrum histogram 17 (see FIG. 2) obtained from the output of the acceleration sensor 7.

The operations of the respective modules of FIG. 8 are as follows: the normality/abnormality identification module 32 determines whether the gas insulated switchgear is normal or abnormal, and asserts the normal or the abnormal output in accordance with the determination. The foreign object intrusion/bad contact identification module 33, having an input coupled to the abnormality output of the normality/abnormality identification module 32, is activated in response to the abnormality output of the normality/abnormality identification module 32, and determines whether the abnormality is caused by an intrusion of a foreign object or by bad contact. In accordance with the determination, the foreign object intrusion/bad contact identification module 33 asserts either of the two outputs: the foreign object output and the bad contact output, which are coupled to an input of the foreign object intrusion state identification module 34 and the bad contact state identification module 35, respectively. The foreign object intrusion state identification module 34 is activated in response to the foreign object output of the foreign object intrusion/bad contact identification module 33 and identifies the position and the state of the foreign object (i.e., determines whether the object is at the central conductor, at the interior surface of the wall of the tank, or floating). On the other hand, the bad contact state identification module 35 is activated in response to the bad contact output of the foreign object intrusion/bad contact identification module 33, and determines the state of the bad contact.

The activations of the respective modules are effected as follows. The output layer of the normality/abnormality identification module 32 consists of two neural elements, corresponding to the normal and the abnormal state. When the output of the neural element corresponding to the abnormal output exceeds a predetermined threshold level, it is judged that the gas insulated switchgear is in the abnormality, and the foreign object intrusion/bad contact identification module 33 is activated to obtain the detailed information of abnormality. If the output of the neural element corresponding to the normal state is great and that of the neural element corresponding to the abnormal state is small, it is judged that the gas insulated switchgear is normal and no other modules are activated.

Figure 9:
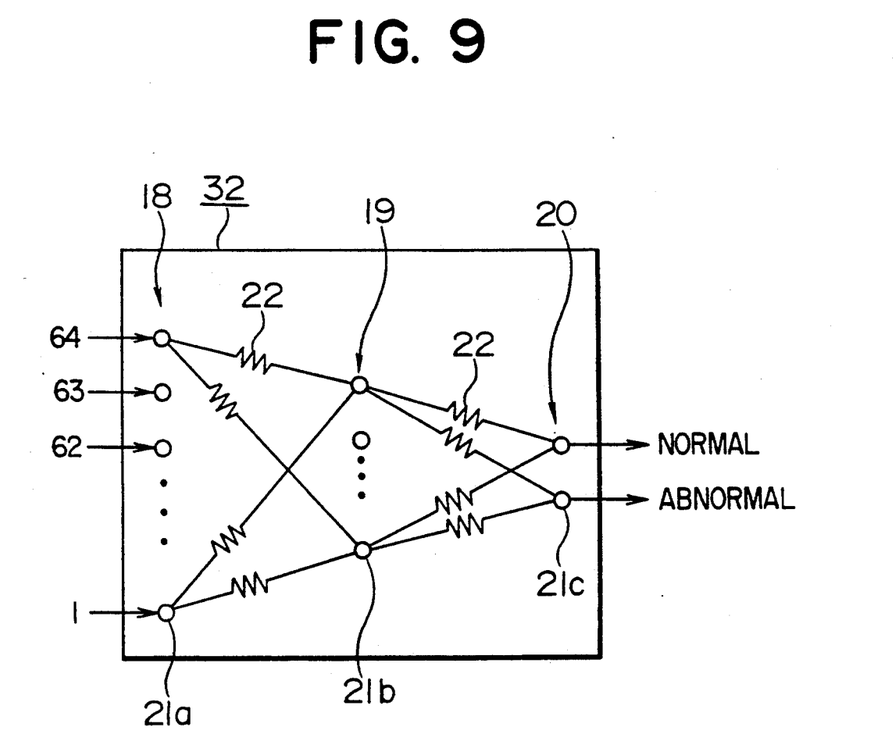
FIG. 9 is a diagram showing an exemplary structure of normality/abnormality identification module of FIG. 8.

FIG. 9 is a diagram showing an exemplary structure of normality/abnormality identification module of FIG. 8. The input layer 18 consists of sixty four neural elements 21a, to which the respective levels of the normalized spectrum histogram 17 obtained from the output of the acceleration sensor 7 are input. The output layer 20, on the other hand, consists of two neural elements 21c corresponding to the normal and the abnormal state, respectively. The structure of the normality/abnormality identification module 32 is similar to that of the neural network 11 of FIG. 3, except for the number of the neural elements 21c of the output layer 20.

In the case of the monitoring diagnosis device of FIG. 8, the learning can be effected separately for the respective modules. First, the spectrum histograms of the output of the acceleration sensor 7 are obtained experimentally for the normal state and the various abnormal states. Each pair of the spectrum histogram and the cause of abnormality corresponding thereto is referred to as an item of the learning data. The causes of abnormality are classified into groups, and respective groups of causes of abnormality are allotted to the respective modules 33, 34, 35.

With respect to the normality/abnormality identification module 32, the connection weights are adjusted on the basis of all items of learning data, such that: when the spectrum histogram corresponding to the normal state is input, the output of the neural element corresponding to the normal state is asserted (i.e., is equal to one or unity) and the output of the neural element corresponding to the abnormal output is negated (i.e., is equal to zero); and when the spectrum histograms corresponding to the abnormal states are input, the outputs are reversed.

With respect to the foreign object intrusion/bad contact identification module 33, only the learning data items corresponding to the abnormal states are used, and the connection weights are adjusted such that: when the spectrum histograms corresponding to the abnormality cause group of foreign object intrusions are input, the output of the neural element corresponding to the foreign object intrusion is asserted while the bad contact output is negated; and when the spectrum histograms corresponding to the bad contacts are input, the outputs are reversed.

With respect to the foreign object intrusion state identification module 34, only the learning data items corresponding to the foreign object intrusions are used, and the connection weights are adjusted such that: when the spectrum histograms corresponding to the state where the foreign object is adhering to the central conductor are input, the output of the neural element corresponding to the central conductor output is asserted while the other outputs are negated; when the spectrum histograms corresponding to the case where the foreign object is adhering to the interior wall of the tank, the output of the neural element corresponding to the interior surface of the tank is asserted while others are negated; and when the spectrum histograms corresponding to the case where the foreign object is floating within the tank, the output of the neural element corresponding to the floating foreign object is asserted while others are negated.

With respect to the bad contact state identification module 35, only the learning data items corresponding to the abnormality cause group of bad contact states are used, and the connection weights are adjusted such that: when the spectrum histograms corresponding to the bad contact at the central parts are input, the output of the neural element corresponding to the central part is asserted while the other is negated; and when the spectrum histograms corresponding to the bad contact of end electrodes are input, the output of the neural element corresponding to the end electrodes is asserted while the other is negated.

According to this embodiment, the neural network device consists of a plurality of modules. The first module (normality/abnormality identification module 32) identifies whether the gas insulated switchgear is normal or abnormal. The second module (foreign object intrusion/bad contact identification module 33) refines the abnormality judgment and divides the causes of abnormality into two groups: the foreign object intrusion and the bad contact. The third (foreign object intrusion state identification module 34) and the fourth (bad contact state identification module 35) further refines the abnormality judgment for the respective two group of causes of abnormality. Thus, the abnormal states can be identified in stepwise refinement, and the user can know the abnormal state in a required decree of precision. Further, the module structure facilitates the learning process. Namely, for the training of the bad contact state identification module 35, only the items of learning data corresponding to the bad contacts must be used; the items of learning data corresponding to the foreign object intrusions are irrelevant. Thus, the number of learning data items can be reduced and hence the time required for the completion of the learning is shortened compared with the case of the first embodiment. Further, when the neural network device is to be updated during actual service to adapt to the changes in the installation site or the changes of characteristics due to aging, it suffices to train only the relevant module. It is not necessary to subject all the modules to the learning step.

Figure 10:
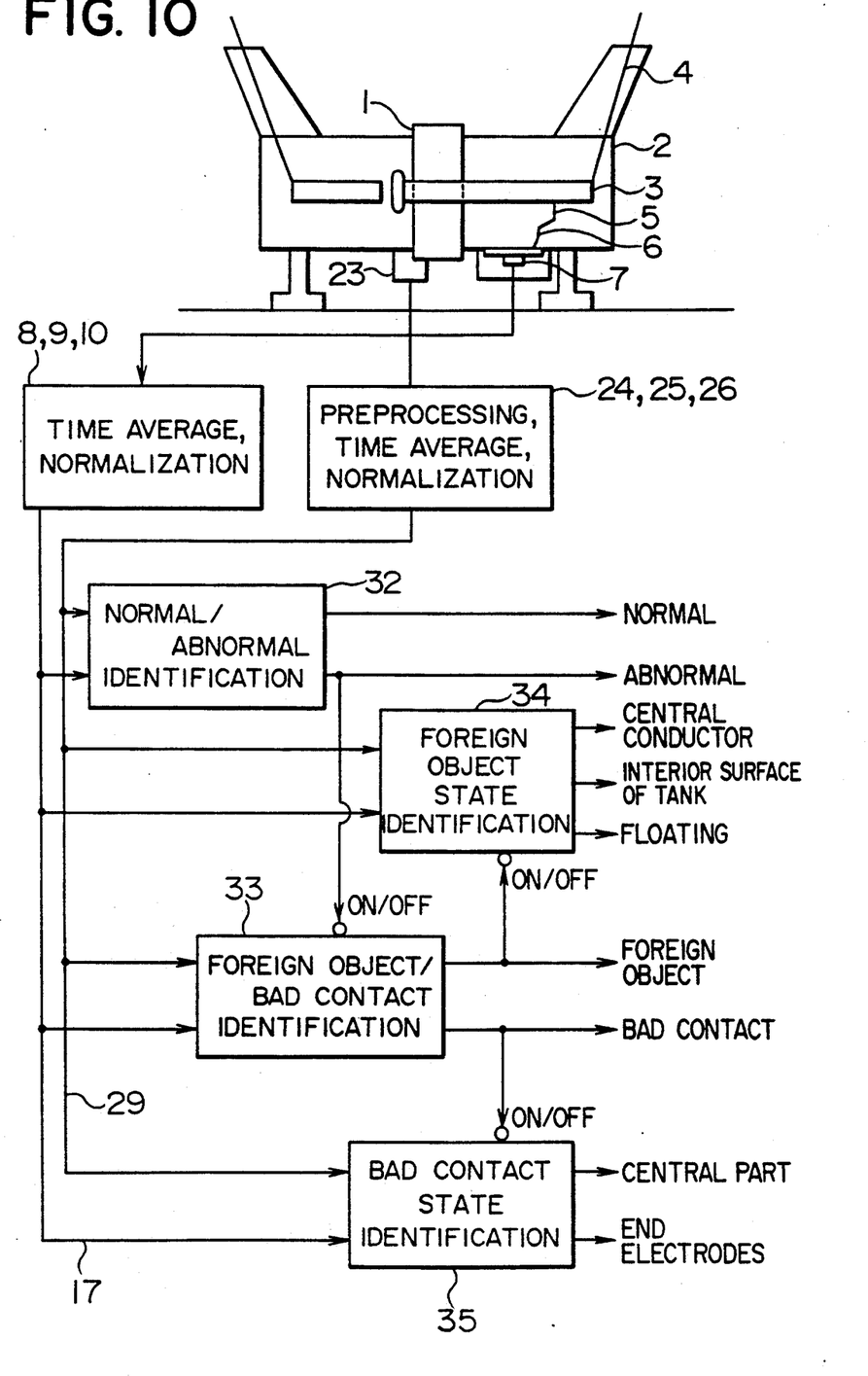
FIG. 10 is a diagrammatic view showing the structure of a monitoring diagnosis device according to a fourth embodiment of this invention.

FIG. 10 is a diagrammatic view showing the structure of a monitoring diagnosis device according to a fourth embodiment of this invention. In the case of this embodiment, the information obtained from the output of the output layer 20 is used in addition to the information obtained from the output of the acceleration sensor 7. The output layer 20 detects the rise of the potential of the tank upon abnormality of the gas insulated switchgear. The output of the partial discharge sensor 23 is processed via the preprocessor 24, the time average calculator 25, and the normalizer 26 (shown together in a single block in FIG. 10) as described above for the case of the second embodiment. The resulting normalized waveform histogram 29 (see FIG. 6) is input to the normality/abnormality identification module 32, the foreign object intrusion/bad contact identification module 33, the foreign object intrusion state identification module 34, and the bad contact state identification module 35, in addition to the normalized spectrum histogram 17 obtained from the output of the acceleration sensor 7. The method of learning is the same as for the third embodiment, except that the identification is more accurate due to the additional information obtained from the output of the partial discharge sensor 23.

Figure 11:
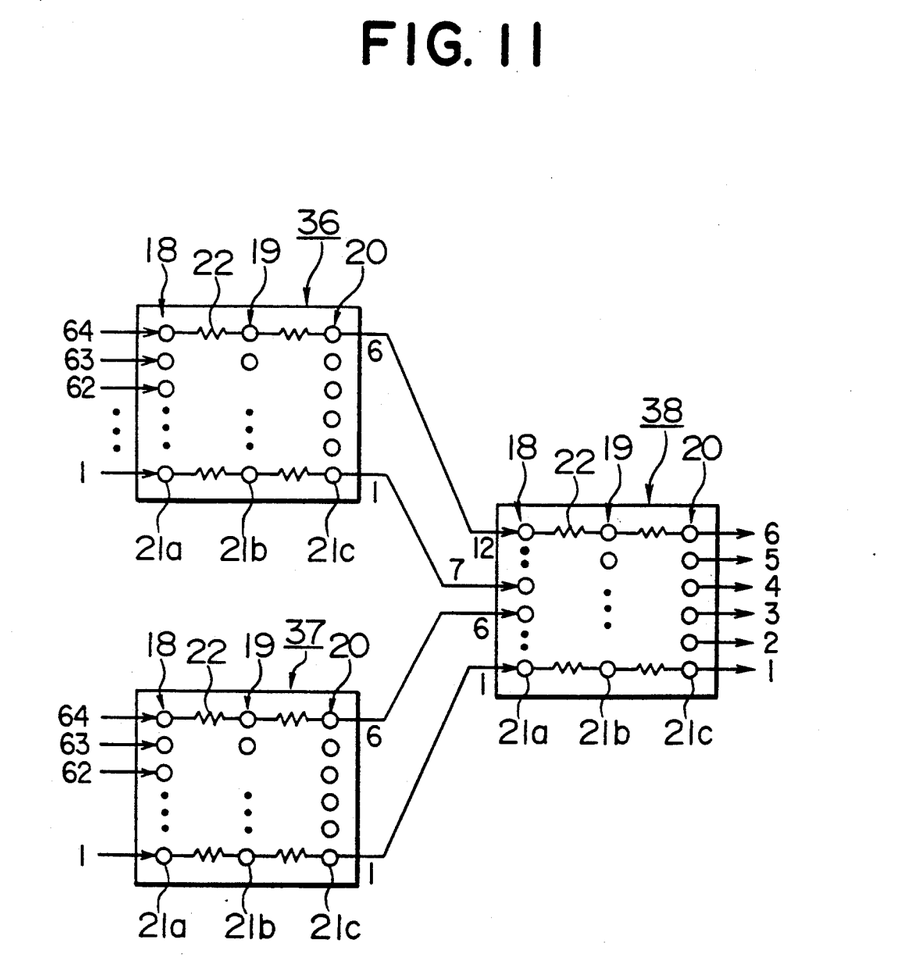
FIG. 11 is a diagram showing the sub-moduled structure of a neural network module of the monitoring diagnosis device of FIG. 10.

FIG. 11 is a diagram showing the sub-moduled structure of a neural network module of the monitoring diagnosis device of FIG. 10. Each of the modules (the normality/abnormality identification module 32, the foreign object intrusion/bad contact identification module 33, the foreign object intrusion state identification module 34, and the bad contact state identification module 35) may be divided into three sub-modules 36, 37, and 38, as shown in FIG. 11. The sixty four levels of the normalized spectrum histogram 17 (see FIG. 2) are input to the neural elements 21a of the input layer 18 of the second input sub-module 37. The sixty four levels of the normalized waveform histogram 29 (see FIG. 6) are input to the neural elements 21a of the input layer 18 of the first input sub-module 36. The inputs are processed by the neural network of the first input sub-module 36 and the second input sub-module 37, respectively. The outputs from the neural elements 21c of the output layer 20 of the first input sub-module 36 and the second input sub-module 37 are input to the corresponding neural elements 21a of the input layer 18 of the output sub-module 38, and are then processed via the neural network of the output sub-module 38, to obtain. The final outputs from the neural elements 21c of the output layer 20 thereof. The connection weights 22 of the respective sub-modules are adjusted to obtain the optimal outputs during the learning step. Although FIG. 11 shows six neural elements 21c of the output layer 20 of the output sub-module 38, the number of the neural elements 21c is generally equal to the number of required outputs: for the normality/abnormality identification module 32, the foreign object intrusion/bad contact identification module 33, and the bad contact state identification module 35, the number is two, while for the foreign object intrusion state identification module 34, the number is three.

The sub-module structure of FIG. 11 may also be used for the neural network 11 of FIG. 5. Then, the six outputs, numbered 1 through 6 of the output sub-module 38 of FIG. 11 would correspond to the six outputs of the neural network 11 of FIG. 5. The six outputs of the first input sub-module 36 and the second input sub-module 37 may correspond to the respective six outputs of the output sub-module 38.

The training of the sub-modules of FIG. 11 can be effected as follows. First, the second input sub-module 37 is trained on the basis of the spectrum histograms obtained from the output of the acceleration sensor 7. This is effected as described above by reference to FIGS. 3 and 4. As a separate and distinct step with respect to this step, the first input sub-module 36 is trained on the basis of the waveform histograms obtained from the output of the partial discharge sensor 23. This is also effected as described above by reference to FIGS. 3 and 4. Further, vising the outputs of the acceleration sensor 7 and the partial discharge sensor 23 simultaneously, the outputs of tho sub-modules 36 and 37 are input to the output sub-module 38 to train it.

In accordance with this fourth embodiment, the information obtained from the output of the partial discharge sensor 23 is input to the neural network device in addition to the information obtained from the output of the acceleration sensor 7. Thus, as in the case of the second embodiment, the abnormal states which cannot be identified solely on the basis of the output information of the acceleration sensor 7 can accurately be identified. Further, when additional sensors are installed, the information obtained from the additional sensors may also be input to the neural network, thereby enhancing the accuracy of the identification of abnormality causes.

In the case of the above embodiments, the acceleration sensor 7 and the partial discharge sensor 23 are mounted on the gas insulated switchgear. The parts 8 through 38, however, may be implemented by means of a program running on a portable calculator or computer and a specially designed hardware (e.g., input/output devices) attached thereto. Further, the monitoring diagnosis devices according to the above embodiments are applied to a gas insulated electric device (more specifically a &,as insulated switchgear). However, the monitoring diagnosis device according to this invention is generally applicable to electrical appliances, such as gas insulated electric devices, oil insulated electrical appliances, air insulated electrical appliances, vacuum insulated electrical appliances, and solid insulated electrical appliances, for interrupters, switchgears, disconnectors, voltage transformers, current transformers, buses, insulated meters, generators or dynamos, and rotating machines.

What is claimed is:

1. A monitoring diagnosis device for an electrical appliance, comprising:

sensor means for detecting a parameter of the electrical appliance and generating an output corresponding to the parameter indicative of a cause of abnormality of the electrical appliance said sensor means including a partial discharge sensor;

a neural network means including an input layer, an intermediate layer, and an output layer, the input layer, intermediate layer, and output layer each consisting of a plurality of neural elements each simulating a living neuron, wherein the neural elements of the input layer are coupled to the neural elements of the intermediate layer via respective connection weights, and the neural elements of the intermediate layer are coupled to the neural elements of the output layer via respective connection weights, and wherein said connection weights between the input layer and intermediate layer and between the intermediate layer and the output layer are adjusted on the basis of learning data consisting of causes of abnormality and instances of the output of said sensor means, such that a neural element of the output layer corresponding to a cause of abnormality has a high logic output in response to the output of said sensor means indicative of the existence of an abnormality while other neural elements of the output layer have a low logic output;

a preprocessor means for preprocessing output waveform samples of the output of said sensor means to obtain characteristic waveforms consisting of peaks each corresponding to an abrupt variation in the waveform samples;

an averaging means for averaging the characteristic waveforms to obtain an average characteristic waveform; and normalizer means for normalizing a peak level of the averaged characteristic waveform to unity and dividing a time interval of the waveform into a plurality of subintervals, to obtain a characteristic waveform histogram;

wherein levels of said characteristic waveform histogram are input to corresponding neural elements of the input layer of said neural network means.

2. A monitoring diagnosis device for an electrical appliance as claimed in claim 1, wherein:

said neural network means comprises at least a first and a second neural network module;

said first module has a normal and an abnormal state output corresponding to a normal and an abnormal state of the electrical appliance, respectively, said first module including an input layer, an intermediate layer, and an output layer, and the input layer, intermediate layer, and output layer each consisting of a plurality of neural elements each simulating a living neuron, wherein the neural elements of the input layer are coupled to the neural elements of the intermediate layer via respective connection weights, and the neural elements of the intermediate layer are coupled to the neural elements of the output layer via respective connection weights, and the connection weights between the input layer and the intermediate layer and between the intermediate layer and the output layer are adjusted, on the basis of learning data consisting of information obtained from the output of said sensor means and a correspondence between the information obtained from the output of said sensor and normal and abnormal states of the electrical appliance, such that said normal state output has a high logic level in response to a normal state of the electrical appliance and said abnormal state output has a high logic level in response to an abnormal state of said electrical appliance; and said second module includes an input layer, an intermediate layer, and an output layer, the input layer, intermediate layer, and output layer each consisting of a plurality of neural elements each simulating a living neuron, wherein the neural elements of the input layer are coupled to the neural elements of the intermediate layer via respective connection weights, and the neural elements of the intermediate layer are coupled to the neural elements of the output layer via respective connection weights, and said connection weights between the input layer and the intermediate layer and between the intermediate layer and the output layer are adjusted on the basis of learning data including causes of abnormality and instances of the output of said sensor means, such that a neural element corresponding to a cause of abnormality has a high logic level in response to the output of said sensor means, wherein said second module has an input coupled to said abnormal state output of said first module and is activated in response to an assertion of abnormal state output of said first module.

3. A monitoring diagnosis device for an electrical appliance as claimed in claim 1, wherein:

said neural network means comprises at least a first, a second, a third and a fourth neural network module, each including an input layer, an intermediate layer, and an output layer, and the input layer, intermediate layer, and output layer each consisting of a plurality of neural elements each simulating a living neuron, wherein the neural elements of the input layer are coupled to the neural elements of the intermediate layer via respective connection weights, and said neural elements of said intermediate layer are coupled to said neural elements of said output layer via respective connection weights;

said first module has a normal and an abnormal state output corresponding to a normal and an abnormal state of the electrical appliance, respectively, and the connection weights between the input layer and the intermediate layer and between the intermediate layer and the output layer are adjusted, on the basis of learning data consisting of information obtained from the output of said sensor means and a correspondence between said information and normal and abnormal states of said electrical appliance, such that said normal state output has a high logic level in response to an output of said sensor means indicative of a normal state of the electrical appliance and said abnormal state output has a high logic level in response to an output of said sensor means indicative of an abnormal state of the electrical appliance;

said second module has an input coupled to the abnormal state output of said first module and said second module being activated in response to a high logic abnormal state output of said first module, and said second module having at least a first and a second output corresponding to a first and a second group of causes of abnormality of the electrical appliance, the connection weights between the input layer and the intermediate layer and between said the intermediate layer and the output layer of said second module are adjusted on the basis of learning data consisting of a plurality of groups of causes of abnormality and instances of the output of said sensor means, such that an output corresponding to a group of causes of abnormality has a high logic level in response to the output of said sensor means;

said third module has an input coupled to the first output of said second module, said third module being activated in response to a high logic level of said first output of said second module, wherein the connection weights between the input layer and the intermediate layer and between the intermediate layer and the output layer of said third module are adjusted on the basis of learning data consisting of a first group of the plurality of causes of abnormality and instances of the output of said sensor means, such that a neural element corresponding to a cause of abnormality belonging to the first group of causes of abnormality has a high logic level in response to the output of said sensor means; and said fourth module has an input coupled to the second output of said second module, said fourth module being activated in response to a high logic level of the second output of said second module, wherein the connection weights between the input layer and the intermediate layer and between the intermediate layer and the output layer of said fourth module are adjusted on the basis of learning data consisting of a second group of the plurality of causes of abnormality and instances of the output of said sensor means, such that a neural element corresponding to a cause of abnormality belonging to the second group of causes of abnormality has a high logic level output in response to the output of said sensor means.

4. A monitoring diagnosis device for an electrical appliance, comprising:

an acceleration sensor which detects mechanical vibrations and generates an output waveform;

a Fast Fourier Transform means for generating spectrum curves of the output waveform by performing a Fast Fourier Transform on the waveform;

means for averaging the spectrum curves to obtain an averaged spectrum curve;

first means for generating a histogram of the averaged spectrum curve;

a partial discharge sensor for detecting variations in potential and for generating an output waveforms;

a preprocessor means for preprocessing the output waveforms of said partial discharge sensor to obtain characteristic waveforms consisting of a plurality of peaks;

an averaging means for averaging the characteristic waveforms to obtain an averaged characteristic waveform; and second means for generating a histogram of the averaged characteristic waveform; and a neural network having first and second inputs connected to said first and second means for generating a histogram, said neural network including an input layer, an intermediate layer, and an output layer, the input layer, intermediate layer, and output layer each consisting of a plurality of neural elements each simulating a living neuron, wherein the neural elements of the input layer are coupled to the neural elements of the intermediate layer via respective connection weights, and the neural elements of the intermediate layer are coupled to the neural elements of the output layer via respective connection weights, and wherein said connection weights between the input layer and intermediate layer and between the intermediate layer and the output layer are adjusted on the basis of learning data consisting of causes of abnormality and instances of the output of said acceleration sensor and said partial discharge sensor, such that a neural element of the output layer corresponding to a cause of abnormality has a high logic output in response to the output waveform of said acceleration sensor and in response to the output waveform of said partial discharge sensor indicative of the existence of an abnormality while other neural elements of the output layer have a low logic output.

5. A monitoring diagnosis device for an electrical appliance as claimed in claim 4, wherein:

said neural network comprises at least a first and a second neural network module;

said first module having a normal and an abnormal state output corresponding to a normal and an abnormal state of the electrical appliance, respectively, said first module including an input layer, an intermediate layer, and an output layer, and the input layer, intermediate layer, and output layer each consisting of a plurality of neural elements; and said second module including an input layer, an intermediate layer, and an output layer, the input layer, intermediate layer, and output layer each consisting of a plurality of neural elements, said second module having an input coupled to said abnormal state output of said first module.

* * * * *